Oct. 18, 1932.  L. SANDLER  1,882,956
BEARING
Filed Aug. 22, 1929
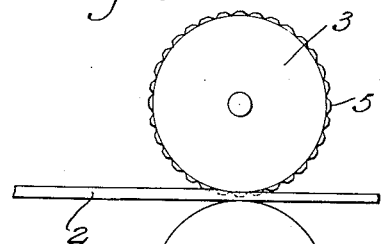
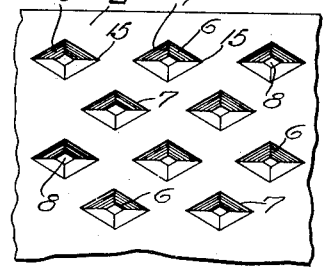
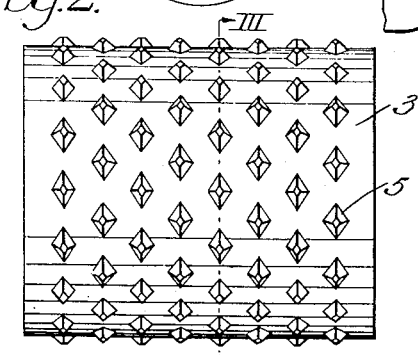
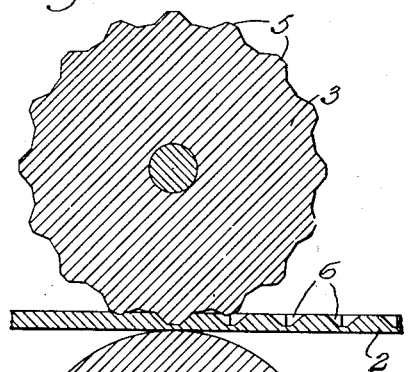
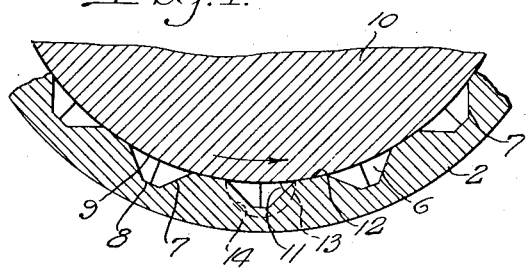
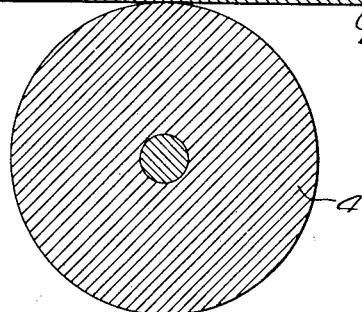
INVENTOR
Louis Sandler
by his attorney
Byrnes, Stebbins, Parmelee & Blenko Patented Oct. 18, 1932

1,882,956

UNITED STATES PATENT OFFICE

LOUIS SANDLER, OF NEW CASTLE, PENNSYLVANIA, ASSIGNOR TO JOHNSON BRONZE COMPANY, OF NEW CASTLE, PENNSYLVANIA, A CORPORATION OF PENNSYLVANIA

BEARING

Application filed August 22, 1929, Serial No. 387,671.

This invention relates generally to bearings and more particularly to bearings provided with pockets adapted to contain a lubricant.

Bearings having pockets therein for a lubricant are now known. The pockets in the bearings are usually formed by passing a sheet of bearing metal between rollers, one of which has semi-spherical projections thereon. This rolling process produces a sheet of bearing metal having semi-spherical recesses therein. The sheet of metal provided with the semi-spherical recesses is then formed into a bearing. A bearing having semi-spherical recesses presents the disadvantage that the walls of the recesses being at an angle of substantially 90° to the bearing surface tends to prevent a film of oil being carried by the shaft as it rotates in the bearing.

In accordance with my invention, recesses are formed in the bearing but the recesses are of such shape that they aid in wedging a thin film of oil between the walls of the pockets and the shaft carried by the bearing and cause the thin film of oil to be carried on the shaft as it rotates. In order to provide this wedging action the walls of the pockets slope at a sharp angle to the bearing surface. As the shaft carried by the bearing rotates it wedges a thin film of oil between the surface of the shaft and the walls of the recesses and causes this film to be carried by the shaft to thoroughly lubricate it.

In the accompanying drawing which illustrates the present preferred embodiment of my invention, Figure 1 is a diagrammatic end view illustrating the method of forming the pockets in the bearing metal;

Figure 2 is a side elevation of the upper row shown in Figure 1;

Figure 3 is a vertical sectional view, to a larger scale than Figure 1, showing the formation of the pockets in the bearing metal;

Figure 4 is an enlarged sectional view illustrating the manner in which a thin film of oil is wedged between the surface of a shaft and the walls of the pockets; and Figure 5 is a partial plan view of a strip of bearing metal provided with pockets adapted to contain lubricant.

Referring to the drawing, the bearing is made by passing a sheet 2 of bearing metal between the rolls 3 and 4. The upper roll 3 is provided with diamond shaped projections 5 which form diamond shaped recesses 6 in the sheet 2. The sheet or strip 2 of bearing metal having the recesses 6 formed therein is thereafter formed into a bearing.

Referring particularly to Figures 2 and 4, the recesses 6 are of such shape that the walls 7 between the bottoms of the recesses and the surface 9 of the shaft 10 mounted in the bearing form sharp angles 11 with the bearing surface 12. As the shaft 10 rotates in the direction indicated by the arrow it causes a thin film of oil to be wedged between the surface 9 of the shaft and the walls 7 of the diamond shaped recesses. Due to this wedging action a thin film of oil is carried by the roll as it rotates.

In Figure 4 the dotted line 13 indicates the wall of semi-spherical pockets heretofore employed for containing lubricant. The wall of the semi-spherical pocket forms an angle of substantially 90° with the bearing surface 12. As the shaft 10 rotates in the direction indicated by the arrow, the film of oil adhering to the shaft is wiped off and drops back into the pocket 14, and the shaft fails to carry a thin film of oil with it as it rotates.

One advantage of forming the recesses in accordance with my invention and as indicated by the full lines 7 in Figure 4 is that the walls of the recesses form a sharp angle with the bearing surface 12, and accordingly with the surface 9 of the shaft, so that a thin film of oil is wedged between the surfaces 9 and 7 which film adheres to the roll even when rotated.

It is preferred that the recesses 6 be substantially diamond shaped as shown in Figure 5. They may, however, be made of other shapes provided that the walls connecting the bottoms and tops of the recesses form sharp angles with the bearing surface in order to provide the wedging action above described. If the recesses are diamond shaped as shown in Figure 5, they not only cause the wedging action of the thin film of oil as previously described, due to the sharp angle between the walls 7 and the bearing surface 12, but they exert an additional wedging action due to the convergence of the walls 7 to form the apices 15. Accordingly, in the preferred form the walls 7 form a sharp angle with the bearing surface 12 and in addition the walls 7 converge to form the apices 15.

I have illustrated and described the present preferred form of my invention. It is to be understood, however, that the invention may be otherwise embodied within the scope of the following claim.

I claim:

A bearing having substantially diamond shaped pockets therein adapted to contain lubricant for a shaft, the walls between the bottoms and tops of the pockets sloping upwardly and outwardly at a sharp angle to the bearing surface in order to wedge a thin film of lubricant between the shaft and walls of the pockets and cause it to be carried by the shaft when rotated.

In testimony whereof I have hereunto set my hand.

LOUIS SANDLER.